United States Patent Office 3,492,254
Patented Jan. 27, 1970

3,492,254
COMPOSITIONS COMPRISING STYRENE-MALEIC ANHYDRIDE COPOLYMER ESTER AND POLY-VINYL ALCOHOL OR CELLULOSIC ETHER
Robert C. Strand, Homewood, and Richard J. Pratt, Flossmoor, Ill., assignors to Sinclair Research, Inc., New York, N.Y., a corporation of Delaware
No Drawing. Filed Mar. 2, 1967, Ser. No. 619,961
Int. Cl. C08f 29/30, 19/02; C08b 21/32
U.S. Cl. 260—17
20 Claims

ABSTRACT OF THE DISCLOSURE

Polyvinyl alcohol and cellulosic ethers are extended with minor amounts of a capped polyalkylene glycolesterified styrene/maleic anhydride copolymer. The copolymer is about 10–100% half-esterified with the polyalkylene glycol, which is capped on one end with an alkyl radical of 1 to about 5 carbon atoms, and the copolymer has an unesterified molecular weight of about 400 to 10,000 and a molar ratio of styrene to maleic anhydride of about 1 to 4:1. The resulting compositions are useful, for example, for preparing cast films for aqueous solutions, which films find application in, for instance, the packaging of laundry detergents, bleaches, etc.

---

This application is directed to polyvinyl alcohol and cellulosic ethers containing as extenders partially esterified styrene/maleic anhydride copolymers.

Polyvinyl alcohol (PVA) and cellulosic ethers have several shortcomings in package film manufacture. These shortcomings include, for instance, cracking under sudden stress at low temperatures, low elongation before breaking, slow solubilization in 90° F. water, poor heat sealability, and poor film release from glass or metal surfaces.

It has been found that the aforementioned disadvantages can be alleviated by blending with the polyvinyl alcohol or cellulosic ethers minor amounts, say up to about 40 weight percent, of certain partially esterfied styrene/maleic anhydride copolymers. The copolymer extenders of the invention are not unduly affected by high humidities and neither bleed nor become absorbed by hygroscopic packaged contents. Moreover, the copolymers are highly compatible with polyvinyl alcohol and cellulosic ethers, giving clear solutions when mixed with water.

The styrene/maleic anhydride copolymers, the partial esters of which are employed in the compositions of the invention, are resinous copolymers of styrene and maleic anhydride having about 1 to 4 moles of styrene per mole of maleic anhydride, and preferably about 1 to 3 moles of styrene per mole of maleic anhydride. Equimolar ratios are often most preferred. The molecular weights of the unesterified copolymers are generally at least about 400 up to about 10,000 but can be of higher molecular weight as long as the ester thereof is water-soluble, or soluble in aqueous alkaline media. A 10 weight percent solution in acetone of the unesterified copolymer generally exhibits a viscosity at 30° C. of about 0.5 to 3 centistokes, with viscosities in the range of about 0.52 to 1 cs. often being preferred. The melting points of the unesterified copolymer will generally be in the range from about 80 to 200° C. as determined by the Fisher-Johns melting point apparatus.

The styrene/maleic anhydride copolymers can be prepared by known methods of the art. A preferred method is by solution polymerization wherein the monomers are polymerized in a suitable solvent employing as a polymerization catalyst a free-radical peroxide catalyst, preferably benzoyl peroxide or dicumyl peroxide, at a temperature of about 75 to 300° C., or more. Suitable solvents include the aromatic hydrocarbon solvents such as cumene, p-cymene, xylene, toluene, etc. The aromatic solvents may be chain-terminating solvents and may be used to give lower molecular weight products. Other suitable solvents are the ketones, such as methylethylketone, which are also active solvents. The preferred manner of carrying out the polymerization is by what can be called incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization the formation of the copolymer causes a heterogeneous system, the polymer layer being the heavier layer and recoverable by merely decanting the upper aromatic solvent layer and drying the residue. On the other hand, when a ketone is the solvent the formed copolymer is usually soluble in the solvent media so that recovery of the products may involve a solvent-stripping operation.

The alcohol employed in the esterification of the styrene/maleic anhydride copolymer will be a capped polyalkylene glycol corresponding to the following general formula:

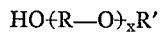
$$HO{+}R{-}O{+}_xR'$$

wherein R is an alkylene radical of 2 to about 5, preferably 2 to 3, carbon atoms, R' is a monovalent alkyl (including cycloalkyl) radical of 1 to about 5 carbon atoms and $x$ is 2 to about 20, preferably 2 to about 10. As specific examples of suitable polyalkylene glycols may be mentioned polyethylene and polypropylene glycols having molecular weights of about 300 to 800 and capped on one end with a lower alkyl group such as methyl.

The extent of half-esterification of the styrene/maleic anhydride copolymer will generally be about 10 to 100%, preferably about 20 to 80%. That is, about 5 to 50%, preferably about 10 to 40%, of the total number of carboxyl groups of the copolymer are esterified with the alcohol. The esterification can be effected by simply heating a mixture of the appropriate quantities of styrene/maleic anhydride copolymer and alcohol at elevated temperatures, usually about 100° to 200° C., often about 170° to 180° C.

Solubility in an aqueous medium of the esterified copolymer can be enhanced by the addition of a suitable base such as, for example, lithium hydroxide, sodium hydroxide, ammonium hydroxide, or an amine. Amines are often preferred, and especially suitable are alkanol amines such as diethanol amine, triethanol amine, etc. The base can be added in various ways, for example by incorporation with a melt of the partially esterified copolymer prior to dissolution in water, or by addition as an aqueous solution. Neutralization of, i.e., salt formation with, the unesterified carboxyl groups of the copolymer is effected by the base addition. When an alkanol amine is employed as the base, addition thereof is preferably at, or near, room temperature, as elevated temperatures tend to promote imide or amide formation at the nitrogen site of the amine. This tends to reduce the water solubility of the resin. The amount of base used, e.g., alkali metal hydroxide, ammonium hydroxide or amine, is that amount sufficient to render the copolymer extender water soluble.

The polyvinyl alcohol resins which may be extended by use of the partially esterified copolymer of the present invention are synthetic resins well known to the art, which have found a variety of uses such as for the preparation of synthetic films and fibers and as intermediates for the preparation of polyvinyl butyral, which is used in laminated safety glass. The resins are most often prepared by first polymerizing monomeric vinyl esters of organic monocarboxylic acids of 1 to 20 carbon atoms, for instance, vinyl acetate, vinyl propionate, vinyl stearate, vinyl benzoate and the like, or mixtures thereof, utilizing peroxide-initiators (both inorganic and organic peroxides), to produce a polyvinyl ester. The polymerization is usually conducted at the reflux temperature of the vinyl ester reaction mixture and the amount of catalyst controlled so that the polymerization reaction terminates at the desired conversion of the vinyl ester to polyvinyl ester. The resulting polyvinyl ester is then at least about 75% hydrolyzed, often at least about 90% hydrolyzed, to form the polyvinyl alcohol. The polyvinyl alcohol resins ordinarily will possess a viscosity on the order of about 25 up to 300 or more centipoises as measured in a 4 weight percent aqueous soution at 20° C.

The cellulosic ethers which may be extended with the partially esterified copolymer are water soluble and are generally classifiable into three types: (1) ionic, sodium cellulose glycolates such as sodium carboxymethylcellulose, (2) nonionic, cellulose glycol ethers such as hydroxyethylcellulose and hydroxypropylcellulose, and (3) nonionic, cellulose monohydric alcohol ethers such as methylcellulose and ethylcellulose. Also suitable are water-soluble cellulosic ethers containing various combinations of the above types of functionalities as, for example, hydroxyethyl ethylcellulose, sodium carboxymethyl hydroxyethylcellulose, hydroxypropyl methylcellulose, methylethylcellulose, hydroxyethyl methylcellulose, and the like.

The partially esterified styrene/maleic anhydride resin is blended with the polyvinyl alcohol resin or water-soluble cellulosic ether in minor amounts. The actual amounts employed will vary depending upon the particular use intended for the blend, but in most cases the composition will contain about 5 to 40%, preferably about 25 to 35%, of the partially esterified styrene/maleic anhydride copolymer, based on the combined weight of the copolymer and the polyvinyl alcohol or cellulosic ether. The blending is conveniently effected by warming an aqueous mixture of the components to a temperature of about 30 to 80° C. Preferred film casting solutions may contain up to about 25 weight percent of combined polyvinyl alcohol and copolymer extender. Often about a 15–20% solution is most preferred.

There may also be present in the compositions of the present invention minor amounts of modifying agents such as dyes, solvents, plasticizers, etc. Thus, for instance, external plasticizing agents such as glycerol and triethylene glycol, while the need for such may often be obviated by the inclusion of the present copolymer extender, may, if desired, also be included.

As indicated by the examples to follow, the compositions of the present invention are ideally suited, due to their water-solubility and component compatibility, for the production of cast films from aqueous solution. These films find application, for example, in the packaging of laundry detergents, bleaches, softeners, and numerous other applications that will be readily apparent to one skilled in the art.

The following examples are included to further illustrate the present invention.

Example I

A mixture of 202 grams of an approximately equimolar styrene/maleic anhydride copolymer, a 10% solution in acetone of which exhibits a viscosity at 30° C. of 0.68–0.72 cs., and 175 grams of methoxypolyethylene glycol having a molecular weight of about 350 is heated with stirring at 170–180° C. for 2 to 3 hours under a nitrogen atmosphere. The molten mass is allowed to cool and solidify in a shallow pan and then ground to less than 60 mesh.

A 100 gram sample of the resultant partially esterified copolymer (about 75% half-ester) requires 4 to 5 grams of sodium hydroxide or 10 to 14 grams of diethanolamine for dissolution in water. Aqueous solution having solids contents up to 30% may be made without encountering viscosities higher than 1500 cps.

Example II

Polyvinyl alcohol (Airco 624, 90% hydrolyzed) is added slowly, with stirring, to cold water to effect a 15 weight percent solution. (Usually, not more than 15–20% concentration is desired because of the high viscosity of the PVA solution.) Four hundred and sixty-seven grams of the 15% aqueous solution of the PVA is added with slow stirring to 150 grams of a 20% aqueous solution of the partially esterified copolymer of Example I, the copolymer solution having been effected by the addition of sufficient diethanolamine to adjust the pH of the solution to 7.0. When completely mixed the resultant blend is allowed to stand several hours for removal of entrapped air.

Using a doctor blade set at 18–20 mils, a small sample of the blend is drawn down on a clean glass plate. The plate is placed in a 120° C. oven for 15 minutes. The resulting dried film is cooled, stripped from the plate and conditioned at about 75° F. and 50% relative humidity for at least four hours. The sheet of film, about 1.4 to 2 mils thick, is cut into 1 inch by 6 inch strips. The jaws of an Instron tensile tester are attached two inches apart to a strip and separated at a speed of 12 inches per minute. Ultimate tensile strength and ultimate elongation for the film of Example II, as well as for the films of various other compositions, are given in Table I.

Also reported in Table I are salt penetration times of films prepared from the PVA-copolymer blends of the present invention, and of film prepared from an unextended PVA. This is a static, non-immersion test to measure the time required for 4 cc. of salt solution to break through a film which is pouched over the top of a beaker. It is a measure of release time uncomplicated by chemical reaction with the package contents, e.g., the oxidizing action of a bleach. Films of 1.5 mil thickness, conditioned at about 75° F. and 50% R.H. for 48 hours, were tested for penetration times of water, dilute aqueous sodium sulfate solution, and dilute aqueous sodium polyphosphate solution.

Also reported in Table I are the compound release times of bleach and detergent-containing packets prepared from various films. Sealed packets containing the indicated bleach or detergent are prepared and stored for periods of 40 to 84 days. The test is then run by dropping the packet into warm water and recording the time, in seconds, required for the bag to break open and release its contents.

Identification of base styrene/maleic anhydride copolymers I–IV of Table I is as follows:

| Base Copolymer | Molar Ratio of Styrene to Maleic Anyhdride | Viscosity of 10% Solution in Acetone at 30° C., cs. | Approximate Molecular Weight |
| --- | --- | --- | --- |
| I | 1:1 | 0.68–0.72 | 1,450 |
| II | 2:1 | 0.70–0.75 | 1,650 |
| III | 3:1 | 0.78–0.83 | 1,600–1,800 |
| IV | 1:1 | 0.52–0.54 | 600–700 |

The identities of esterifying alcohols A and B of Table I are as follows:

(A) Methoxypolyethylene glycol, mol. wt. of about 350.

(B) Methoxypolyethylene glycol, mol. wt. of about 750.

In each of blends 1–8, 10 and 11 of Table I there were employed 70 parts of PVA to 30 parts of the copolymer extender. As in Example II, the partially esterified copolymer was dissolved in water with the aid of a base, either sodium hydroxide or diethanolamine. The amount of base was in each case sufficient to render the copolymer water-soluble and often was sufficient to form a salt with about 60% of the total number of potential unesterified carboxyl groups in the copolymer.

mer being esterified with an alcohol corresponding to the general formula:

$$HO{-}(R{-}O)_x R'$$

wherein R is alkylene of 2 to about 5 carbon atoms, R'

TABLE I.—PROPERTIES OF FILMS PREPARED FROM PVA-COPOLYMER BLENDS

| Blend No. | Base Copolymer | Esterifying Alcohol | Degree of Half-Esterification, percent | Solubilizing Base | Tensile Strength, p.s.i. | Elongation, percent | Salt Penetration Time, Sec. | | | Compound Release Time, Sec. | | | |
|---|---|---|---|---|---|---|---|---|---|---|---|---|---|
| | | | | | | | | | | Dash [1] | | Action [2] | |
| | | | | | | | $H_2O$ (distilled) | $Na_2SO_4$ (3% soln.) | $Na_5P_3O_{10}$ (5% soln.) | 40 days | 84 days | 40 days | 84 days |
| 1 | I | A | 75 | DEA[3] | 3,800 | 210 | | | | | | | |
| 2 | II | B | 25 | NaOH | 5,035 | 25 | | | | | | | |
| 3 | II | A | 75 | DEA | 4,750 | 212 | | | | | | | |
| 4 | III | A | 50 | DEA | 3,055 | 160 | | | | | | | |
| 5 | III | A | 50 | NaOH | 3,800 | 200 | 15.6 | 23.6 | 30.2 | | | | |
| 6 | III | A | 100 | NaOH | 2,850 | 190 | | | | | | | |
| 7 | IV | A | 75 | DEA | (4) | (4) | | | | | | | |
| 8 | IV | A | 50 | DEA | 2,625 | 230 | | | | | | | |
| 9 | (5) | (5) | (5) | (5) | 6,000 | 25 | 22 | 28 | 35 | 55 | 75 | 65 | 110 |
| 10 | IV | A | 25 | NaOH | | | 9.3 | 14.5 | 16.4 | 12.0 | 10.4 | 12.8 | 14.4 |
| 11 | II | A | 100 | NaOH | | | 10.8 | 16.7 | 20.0 | 11.5 | 9.4 | 12.2 | 13.0 |

[1] Commercial powdered detergent.
[2] Potassium dichloro isocyanuric acid based bleach.
[3] Diethanol amine.
[4] Too limp to test.
[5] Polyvinyl alcohol alone (without copolymer extender).

The data of Table I illustrate the general improvement in ultimate elongation of films cast from polyvinyl alcohol which has been extended with the partially esterified styrene/maleic anhydride copolymer as compared with the film prepared from the unextended PVA. Ultimate tensile strengths, although lowered somewhat by the presence of the copolymer, were still generally satisfactory. Salt penetration times for the extended films are seen to be significantly shorter than those reported for the unextended PVA film. Moreover, the short release times of stored packets prepared from the blends of the present invention illustrate that the film compositions of the present invention are not unduly adversely affected, as regards water-solubility, by contact over an extended period of time with detergent and bleach.

Example III

Cellulosic films were prepared employing 70 weight percent of the cellulosic ethers identified in Table II below and 30 weight percent of 1:1 styrene/maleic anhydride copolymer partially esterified with methoxy polyethylene glycol having a molecular weight of about 350. The films were tested for ultimate tensile strength as in Example II and the results are shown in Table II.

TABLE II

| Cellulose ether: | Ultimate tensile strength, p.s.i. |
|---|---|
| Hydroxy (polyethyleneoxy) cellulose (Natrosol 250 LR) | 1000–1400 |
| Sodium carboxymethylhydroxy ethylcellulose (CMHEC) | 1000–1300 |
| Sodium carboxymethylcellulose (CMC–7A) | 2000 |
| Methylcellulose (Methocel HG, 400 cps.) | 3000–3400 |

It is claimed:

1. A composition comprising a major amount of water-soluble, film-forming material selected from the group consisting of cellulosic ethers and polyvinyl alcohol resin, said polyvinyl alcohol resin being at least about a 75 percent hydrolysis product and having a molecular weight such that a 4 weight percent aqueous solution thereof exhibits a viscosity at 20° C. of about 25 to 300 centipoises, and a minor amount of an about 10 to 100 percent half-ester of a copolymer of styrene and maleic anhydride, the molar ratio of styrene to maleic anhydride in said copolymer being from about 1:1 to 4:1, said copolymer being esterified with an alcohol corresponding to the general formula:

$$HO{-}(R{-}O)_x R'$$

wherein R is alkylene of 2 to about 5 carbon atoms, R' is alkyl of 1 to about 5 carbon atoms, and x is 2 to about 20, and said copolymer having an unesterified molecular weight of about 400 to 10,000.

2. The composition of claim 1 wherein x is 2 to about 10.

3. The composition of claim 2 wherein the alcohol is methoxy polyethylene glycol.

4. The composition of claim 3 wherein the film-forming material is polyvinyl alcohol resin.

5. The composition of claim 3 wherein the film-forming material is cellulosic ether.

6. The composition of claim 1 wherein the copolymer is about 20 to 80 percent half-esterified with said alcohol.

7. The composition of claim 6 wherein the copolymer is present in an amount of about 5 to 40%, based on the combined weight of said film-forming material and said copolymer.

8. A composition comprising about 95 to 60 weight percent of a water-soluble polyvinyl alcohol resin, said polyvinyl alcohol resin being at least about a 75 percent hydrolysis product and having a molecular weight such that a 4 weight percent aqueous solution thereof exhibits a viscosity at 20° C. of about 25 to 300 centipoises, and about 5 to 40 weight percent of an about 20 to 80 percent half-ester of a copolymer of styrene and maleic anhydride, the molar ratio of styrene to maleic anhydride in said copolymer being from about 1:1 to 3:1, said copolymer being esterified with an alcohol corresponding to the general formula:

$$HO{-}(R{-}O)_x R'$$

wherein R is alkylene of 2 to 3 carbon atoms, R' is alkyl of 1 to about 5 carbon atoms and x is a number providing a molecular weight for said alcohol of about 300 to 800, and said copolymer having an unesterified molecular weight of about 400 to 10,000.

9. The composition of claim 8 wherein the alcohol is methoxy polyethylene glycol.

10. The composition of claim 9 wherein the molar ratio of styrene to maleic anhydride in the copolymer is about 1:1.

11. An unsupported film cast from an aqueous solution of the composition of claim 1.

12. The composition of claim 10 wherein the polyvinyl alcohol is at least about a 90 percent hydrolysis product.

13. The composition of claim 12 comprising about 75 to 65 weight percent of said polyvinyl alcohol resin and about 25 to 35 weight percent of said copolymer.

14. A composition comprising about 95 to 60 weight percent of a water-soluble cellulosic ether selected from the group consisting of hydroxy (polyethyleneoxy) cellulose, sodium carboxymethylhydroxyethylcellulose, sodium carboxymethylcellulose and methylcellulose and about 5 to 40 weight percent of an about 20 to 80 percent half-ester of a copolymer of styrene and maleic anhydride, the molar ratio of styrene to maleic anhydride in said copolymer being from about 1:1 to 3:1, said copolymer being esterified with an alcohol corresponding to the general formula:

$$HO(R—O)_xR'$$

wherein R is alkylene of 2 to 3 carbon atoms, R' is alkyl of 1 to about 5 carbon atoms and $x$ is a number providing a molecular weight for said alcohol of about 300 to 800, and said copolymer having an unesterified molecular weight of about 400 to 10,000.

15. The composition of claim 14 wherein the alcohol is methoxy polyethylene glycol.

16. The composition of claim 15 wherein the molar ratio of styrene to maleic anhydride in the copolymer is about 1:1.

17. The composition of claim 16 comprising about 75 to 65 weight percent of said cellulosic ether and about 25 to 35 weight percent of said copolymer.

18. The composition of claim 17 wherein the cellulosic ether is methylcellulose.

19. An unsupported film cast from an aqueous solution of the composition of claim 13.

20. An unsupported film cast from an aqueous solution of the composition of claim 17.

References Cited

UNITED STATES PATENTS

| | | | |
|---|---|---|---|
| 2,419,880 | 4/1947 | Blyler et al. | |
| 3,132,075 | 5/1964 | Johnson | 260—17 XR |
| 3,243,398 | 3/1966 | Bonzagni | 260—29.6 |
| 3,306,863 | 2/1967 | Leitner | 260—17 XR |

WILLIAM H. SHORT, Primary Examiner

L. M. PHYNES, Assistant Examiner

U.S. Cl. X.R.

260—874, 29.6, 33.4

UNITED STATES PATENT OFFICE
CERTIFICATE OF CORRECTION

Patent No. 3,492,254      Dated January 27, 1970

Inventor(s) Robert C. Strand and Richard J. Pratt

It is certified that error appears in the above-identified patent and that said Letters Patent are hereby corrected as shown below:

Table I, to the right of "Blend No. 1", and under "Solubilizing Base", delete "$DEA^1$", and insert therefor --$DEA^3$--.

SIGNED AND SEALED
SEP 1 - 1970

(SEAL)
Attest:

Edward M. Fletcher, Jr.
Attesting Officer

WILLIAM E. SCHUYLER, JR.
Commissioner of Patents